July 4, 1939.  M. P. BLOMBERG  2,164,444
COOLING OF RAILWAY TRACTION MOTORS
Filed Jan. 2, 1937  2 Sheets-Sheet 1

Inventor
Martin P. Blomberg
By Blackmore, Spencer & Flint
Attorneys

July 4, 1939. M. P. BLOMBERG 2,164,444
COOLING OF RAILWAY TRACTION MOTORS
Filed Jan. 2, 1937  2 Sheets-Sheet 2

Inventor
Martin P. Blomberg
By Blackmore, Spencer & Shinn
Attorneys.

Patented July 4, 1939

2,164,444

UNITED STATES PATENT OFFICE 2,164,444

COOLING OF RAILWAY TRACTION MOTORS

Martin P. Blomberg, Hinsdale, Ill., assignor to General Motors Corporation, Detroit, Mich., a corporation of Delaware Application January 2, 1937, Serial No. 118,788

14 Claims. (Cl. 105—59)

This invention broadly relates to railway vehicles and in particular to electric locomotives having means for cooling the motors contained therein.

In the construction of electric locomotives, especially those of the Diesel-electric type, the problem of cooling the traction motors contained therein involves many factors. The motors are usually operated under rather severe conditions and are liable to become hot unless special precautions are taken. If the motors become overheated, the efficiency thereof will be reduced and damage to the insulation and other parts will be likely to occur. The motors are arranged beneath the main vehicle body and since the space available is somewhat limited, the motors are usually designed to operate at more nearly their full capacity than would otherwise be the case. In addition, the arrangement is such that practically all the space is utilized and very little natural cooling can take place. Accordingly, some external form of cooling must be provided and, therefore, it is an object of this invention to provide a simple, compact and easily constructed means for cooling traction motors involving means for supplying clean air from inside the car body to the motors, having certain advantages over cooling devices heretofore used.

Another object of this invention is a locomotive construction in which is provided a cooling means for traction motors involving passageways formed in the truck bolster and transom members leading to the traction motor housings.

Still another object of this invention is the provision of a cooling means for traction motors in which a longitudinally extending passageway in the truck bolster is connected with an opening in a hollow transom, the connection involving a means to insure a tight joint between the longitudinally extending passageway and the opening in the hollow transom during relative movement between the bolster and transom so that air for cooling may be conducted within the two members at all times during operation of the locomotive.

It is also an object of this invention to provide a light weight truck construction in which the transom and bolsters have air ducts formed therein for cooling purposes.

A further object of this invention is an improved means for transmitting air for cooling traction motors involving a passageway in the pivotal connection between the main body and truck leading to a longitudinally extending passageway formed in the car bolster which joins an air duct formed in the truck transom, the motor housing being connected with an opening in the transom by means of a flexible connection which permits slight relative movement between the motor and transom.

A specific object of this invention is the provision of air means for cooling traction motors mounted on a six wheel truck involving the use of hollow transoms to which the motor housings are joined by means of flexible connections, said hollow transoms being connected with a longitudinally extending air passageway formed in the bolster which connects with an opening formed in the pivotal connection between the truck and locomotive body.

Other objects and advantages of this invention will become more apparent as the description proceeds. Reference is herein made to the accompanying drawings forming a portion of this specification in which.

Figure 1:
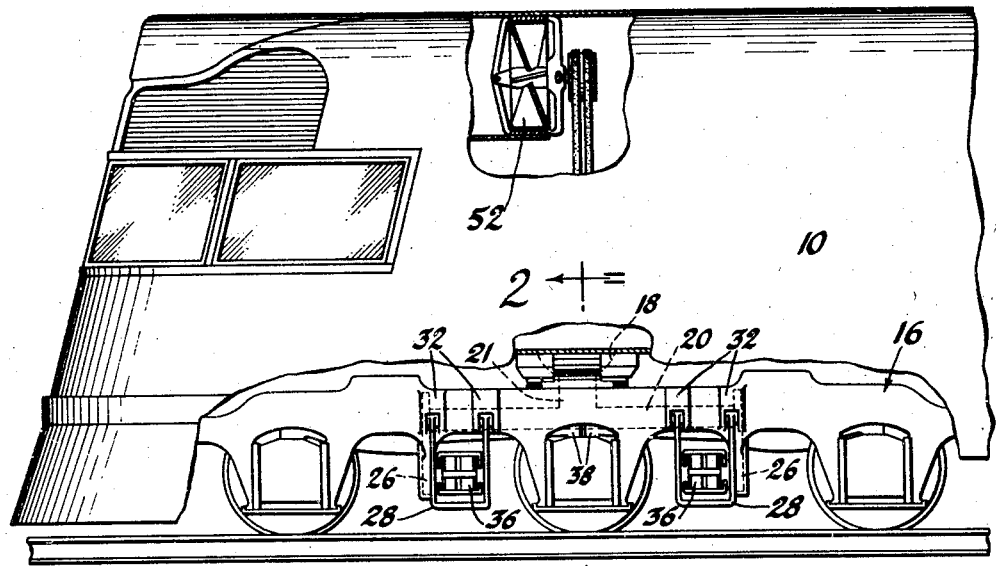
Figure 1 is an elevational view with parts broken away of a Diesel-electric locomotive having my invention incorporated therein.
Figure 2:
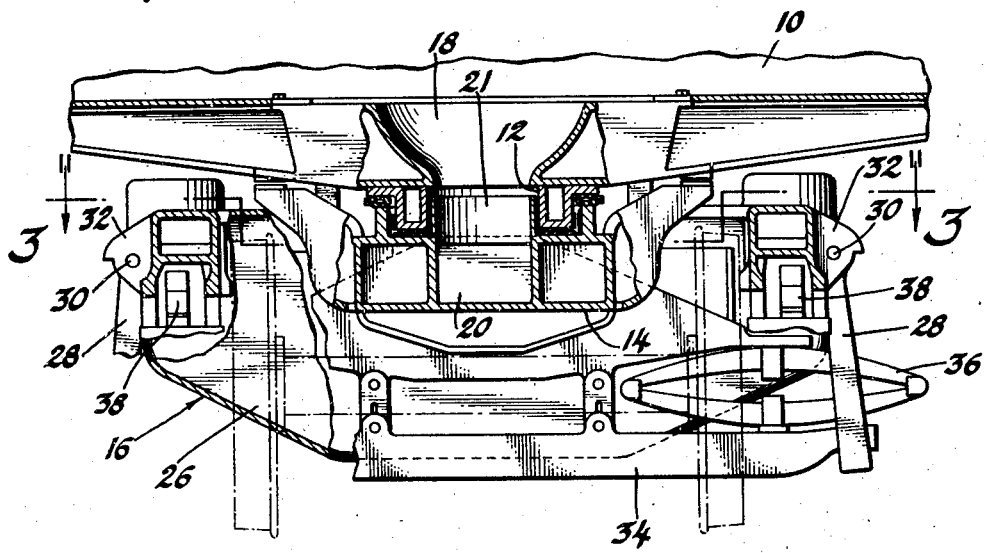
Figure 2 is a view taken substantially on line 2—2 in Figure 1.
Figure 3:
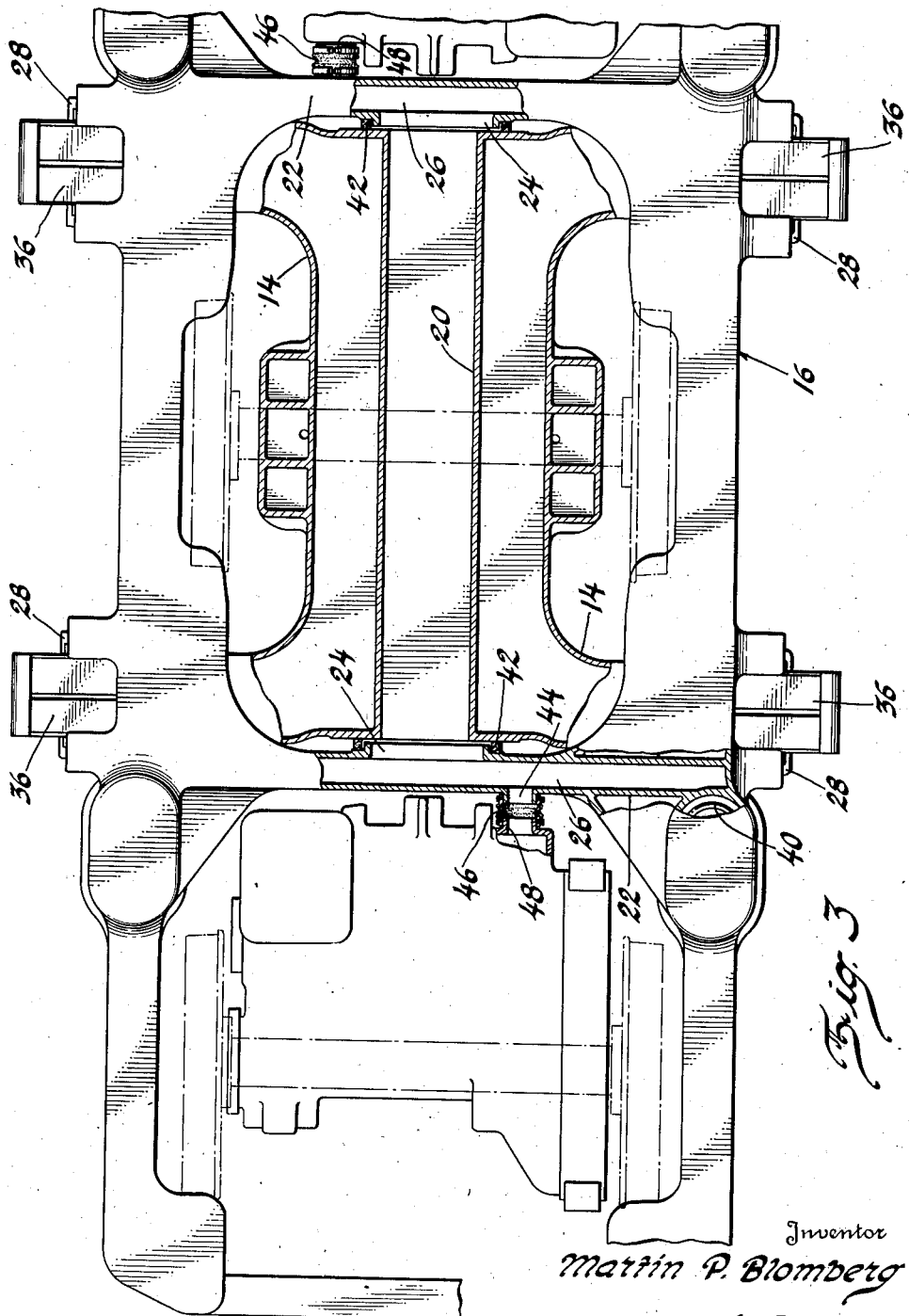
Figure 3 is a view substantially on line 3—3 in Figure 2.

In the drawings, 10 is a Diesel-electric locomotive body joined by means of a pivotal connection 12 to a hollow truck bolster 14 of a truck 16 of the six wheel type, generally indicated at 16. Preferably, the bolster may be formed as a one piece casting. While at present this is the preferred form, the hollow bolster may be, if desired, built of parts of steel or other suitable material, welded together. The bolster 14 has a longitudinally extending air passageway 20 formed therein. An opening 18 in the locomotive body is provided through which air may pass into an opening 21 in the bolster at the pivotal connection and thus into the air passageway in the bolster. The air passageway leads forwardly and rearwardly of the pivot point and at the forward and rearward ends of the bolster joins openings 24 in the walls of hollow transom members 22. The openings 24 connect air passageways 26 in the transoms with the bolster air passageway. Other openings 44 in the walls of the two transoms are joined to motor housings or casings 48 by means of the bellows or other suitable connections 46. The bellows may be made of any desired material but, as shown in the drawings, consist of rubber composition reinforced by wires. In the six wheel truck shown in the drawings, a traction motor is provided for each of the front and rear pair of wheels, while none is used for the central pair.

The bolster is resiliently mounted by means of bolster springs 36 which are secured to a spring plank 34 suspended from the frame 32 of the truck by means of swing hangers 28, pivoted at 30 to the frame. The truck frame is resiliently supported on equalizer bars 38 by means of coil or other spring means 40. The resilient mounting means just described permits relative movement to take place between the bolster and transoms during operation of the device. This means that the air passageways in the bolster and transoms will move with respect to each other. In order to prevent air from escaping at the points where the passageways in the bolster and transoms join, gaskets 42 of felt, or other suitable material, are provided at these points. The gaskets form air tight joints or seals and at the same time allow for relative movement between the transoms and bolster.

During operation of the vehicle air will be supplied under pressure to the longitudinal air passageway in the bolster through the pivotal connection between the locomotive body and truck. The pressure will cause the air to flow into the air passageways in the transoms and from the transoms through the bellows to the motor housings to cool the traction motors. The gaskets prevent loss of air between the bolster air passageway and transoms while allowing relative movement between the transoms and bolster. The bellows between the transoms and motor housings permit slight movements to take place between the transoms and motor casings that may result from the form of motor suspension used.

The air for cooling preferably is supplied from some point in the locomotive body. A slight pressure in the engine compartment caused by fan 52 will force the air through an opening in the floor and into the pivotal connection leading to the air passageway in the bolster. If desired, a separate blower may be used having a connection leading to the air passageway in the bolster.

While the invention has been shown and described in connection with a locomotive having a truck of the six wheel type having traction motors at the front and rear axles thereof, it will be understood that the basic features of my invention may be used in connection with trucks having any desired numbers of wheels and traction motors. It will likewise be understood that various changes and modifications may be made in the construction and arrangements of the several parts without departing from the spirit of my invention and I do not desire to limit the patent granted thereon other than as necessitated by the prior art.

I claim:

1. In a locomotive construction, a truck bolster having an air passageway formed therein having an open end, a transom having an air passageway formed therein and having an opening in one wall thereof adjacent said open end of the air passageway in the bolster, one of said bolster and transom being fixed on the truck and the other mounted on the truck for relative movement thereto, means for connecting said open end of the bolster passageway and adjacent transom wall opening to prevent leakage of air while permitting relative movement therebetween, and means for connecting the air passageway in the transom with a traction motor housing to cool the traction motor.

2. A device as in claim 1, in which the last mentioned means comprises a flexible connection between the transom and motor housing.

3. A device as in claim 1 in which the last mentioned means comprises a flexible bellows adapted to permit relative movement between the motor housing and transom.

4. In a locomotive construction, a truck bolster having an opening in one wall near the center thereof, an air passageway formed in the bolster leading from said wall opening to one end of the bolster and having an open end, a transom having an air passageway therein and an opening in one wall adjacent the open end of the bolster air passageway, one of said bolster and transom being fixed on the truck and the other mounted on the truck for relative movement thereto, a gasket for connecting the open end of the air passageway in the bolster and adjacent transom opening to prevent loss of air during relative movement between the two, a traction motor and housing therefor, and means for connecting said transom air passageway with said traction motor housing.

5. A device as in claim 4, in which the last mentioned means comprises a bellows adapted to permit relative movement between the motor housing and transom.

6. In a locomotive construction having a six wheel truck pivotally connected to the locomotive body; a truck bolster having an opening in a wall thereof at the pivotal connection, an air passageway therein extending to each end of the bolster and being open at each end, a transom at each end of the bolster having an air passageway therein formed by the walls of the transom, one of said walls having an opening adjacent the open end of the air passageway in the bolster, one of said bolster and transom being fixed on the truck and the other mounted on the truck for relative movement thereto, gaskets for connecting the open ends of the bolster air passageways and adjacent openings in the transoms to prevent air leakage while permitting relative movement between the bolster and transoms, a traction motor adjacent each transom having a housing therefor, and means for connecting the air passageway in each transom with the adjacent motor housing.

7. A device as in claim 6 in which the last mentioned means comprises flexible connections to permit relative movement between each transom and housing.

8. A device as in claim 6 in which the last mentioned means comprises bellows adapted to permit relative movement between each motor housing and adjacent transom.

9. In a locomotive construction, a hollow truck bolster pivoted to the locomotive body at the center thereof, a horizontal air passageway formed in said bolster and having open ends, means to admit air to the air passageway at the pivotal connection with the locomotive body, a transom mounted at each end of the bolster having an air passageway therein formed by the walls thereof, one of said walls in each transom having an opening adjacent an open end of the air passageway in the bolster, one of said bolster and transom being fixed on the truck and the other mounted on the truck for relative movement thereto, means for connecting the open ends of the bolster air passageways and adjacent transom wall openings while permitting relative movement between the two, a traction motor adjacent either transom and means for directing air from said transoms to said traction motors.

10. In a locomotive construction, a hollow truck bolster having a longitudinally extending air passageway formed therein and extending to either end thereof, means for admitting air to the air passageway in the bolster, a transom adjacent either end of the bolster having an air passageway therein formed by the transom walls, means for supporting the bolster for movement vertically with respect to the transom, means to join the air passageways in the bolster and adjacent transom while permitting the relative movement therebetween, a traction motor adjacent either transom and means for directing air from said transoms to said traction motors.

11. A device as in claim 10 in which the means for admitting air to the air passageway in the bolster comprises a duct leading from the locomotive superstructure to the air passageway in the bolster.

12. In a locomotive construction, a truck bolster having an air passageway therein, means for admitting air to said air passageway, a transom having an air passageway formed therein, one of said bolster and transom being fixed on the truck and the other mounted on the truck for relative movement thereto, said bolster and transom being movable with respect to each other during operation of the locomotive, means for connecting in an air tight manner the passageways in the bolster and transom, a traction motor adjacent said transom and means for directing air from said transom to said traction motor.

13. In a locomotive construction, a truck bolster having an air passageway formed therein and having an open end, a transom having an air passageway formed therein and having an opening in one wall thereof adjacent said open end of the air passageway in the bolster, one of said bolster and transom being fixed on the truck and the other mounted on the truck for sliding movement relative thereto, means for connecting said open end of the bolster passageway and adjacent transom wall opening to prevent leakage of air while permitting sliding relative movement therebetween, and means for connecting the air passageway in the transom with a traction motor housing to cool the traction motor.

14. In a locomotive construction, a truck bolster having an air passageway therein, means for admitting air to said air passageway, a transom having an air passageway formed therein, one of said bolster and transom being fixed on the truck and the other mounted on the truck for relative movement thereto, said bolster and transom being vertically movable with respect to each other during operation of the locomotive, means for connecting in an air-tight manner the passageways in the bolster and transom, a traction motor adjacent said transom and means for directing air from said transom to said traction motor.

MARTIN P. BLOMBERG.